(12) United States Patent
Loussides et al.

(10) Patent No.: US 10,689,122 B2
(45) Date of Patent: Jun. 23, 2020

(54) ICING DETECTION SYSTEMS

(71) Applicant: Sikorsky Aircraft Corporation, Stratford, CT (US)

(72) Inventors: George N. Loussides, Branford, CT (US); Sean S. Carlson, New Milford, CT (US); Garrett Pitcher, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 177 days.

(21) Appl. No.: 15/471,700

(22) Filed: Mar. 28, 2017

(65) Prior Publication Data

US 2017/0283078 A1 Oct. 5, 2017

Related U.S. Application Data

(60) Provisional application No. 62/314,871, filed on Mar. 29, 2016.

(51) Int. Cl.
| | | |
|---|---|---|
| *B64D 15/22* | (2006.01) | |
| *B64D 45/00* | (2006.01) | |
| *G01S 7/497* | (2006.01) | |
| *G01S 7/48* | (2006.01) | |
| *G01S 17/89* | (2020.01) | |

(52) U.S. Cl.
CPC ............ *B64D 15/22* (2013.01); *B64D 45/00* (2013.01); *G01S 7/4808* (2013.01); *G01S 7/497* (2013.01); *G01S 17/89* (2013.01); *G01S 2007/4977* (2013.01)

(58) Field of Classification Search
CPC ......... B64D 15/22; B64D 45/00; G01S 17/89; G01S 7/4808; G01S 7/497; G01S 2007/4977
USPC .............................................................. 701/3
See application file for complete search history.

(56) References Cited

U.S. PATENT DOCUMENTS

| | | | |
|---|---|---|---|
| 6,961,445 B1 | 11/2005 | Jensen et al. | |
| 8,325,338 B1 * | 12/2012 | Pope .................... | G01J 3/0291 340/962 |
| 9,625,248 B2 * | 4/2017 | Figueroa-Karlstrom ..................... | B64D 15/20 |
| 2012/0261516 A1 * | 10/2012 | Gilliland ............... | G01S 17/107 244/183 |
| 2013/0113926 A1 | 5/2013 | Chen et al. | |
| 2013/0320145 A1 * | 12/2013 | McGillis ............... | G01F 23/284 244/134 C |
| 2016/0245178 A1 * | 8/2016 | Bhabhrawala ......... | B64D 15/20 |

\* cited by examiner

*Primary Examiner* — Brian P Sweeney
(74) *Attorney, Agent, or Firm* — Cantor Colburn LLP

(57) ABSTRACT

A system for detecting icing includes an optical sensor configured to view at least a portion of an exterior surface or component of an aircraft and to output sensor data indicating at least one optical quality of the exterior surface or component, and an icing detection module. The icing detection module is configured to receive the sensor data from the optical sensor, compare the sensor data to predetermined quality data indicating at least one known optical quality of the exterior surface or component without icing, and determine the presence of icing on the exterior surface or component based on a difference between the sensor data and the predetermined quality data.

17 Claims, 1 Drawing Sheet

ICING DETECTION SYSTEMS

CROSS-REFERENCE TO RELATED APPLICATIONS

This application claims the benefit of and priority to U.S. Provisional Patent Application Ser. No. 62/314,871 filed Mar. 29, 2016, which is incorporated herein by reference in its entirety for all purposes.

BACKGROUND

1. Field

The present disclosure relates to icing, more specifically to icing detection systems.

2. Description of Related Art

Ice buildup on an aircraft, in particular on the control surfaces, actuators, pitot tubes, etc. can lead to loss of control and reduced lift. Although there are systems and/or procedures in place to prevent or counteract ice, icing still occurs. Considering the sensitivity of many wings, rotors, control surfaces (e.g., having an almost imperceptibly thin layer can cause a dramatic drop in aerodynamic performance), traditional systems and methods for determining ice buildup are insufficient to detect and/or stop icing.

Such conventional methods and systems have generally been considered satisfactory for their intended purpose. However, there is still a need in the art for improved icing detection systems. The present disclosure provides a solution for this need.

SUMMARY

A system for detecting icing includes an optical sensor configured to view at least a portion of an exterior surface or component of an aircraft and to output sensor data indicating at least one optical quality of the exterior surface or component, and an icing detection module. The icing detection module is configured to receive the sensor data from the optical sensor, compare the sensor data to predetermined quality data indicating at least one known optical quality of the exterior surface or component without icing, and determine the presence of icing on the exterior surface or component based on a difference between the sensor data and the predetermined quality data.

The optical sensor can include a LIDAR sensor for example, or any other suitable sensor. The optical sensor can be mounted to the aircraft to have a line of sight view of the exterior surface or component.

In certain embodiments, the predetermined optical quality data can include a nominal shape of the exterior surface or component. The sensor data can include a current shape of the exterior surface or component. For example, the optical sensor can be configured to create a 3D point cloud of the exterior surface or component.

In certain embodiments, the sensor data can include reflectance of the exterior surface or component. Any other suitable optical quality of the exterior surface or component is contemplated herein.

The predetermined optical quality data can be received from a database. However, in certain embodiments, the predetermined optical quality data can be created on system start up before flight.

The icing detection module can be configured to send an alert to a pilot to indicate icing conditions. In certain embodiments, the icing detection module can be further configured to activate a deice system if icing is determined to be present. The icing detection module can be configured to determine whether a deice system is sufficient to counteract the determined icing and to alert a pilot if the deice system is not sufficient to counteract the determined icing.

In accordance with at least one aspect of this disclosure, a method for detecting icing on an aircraft can include receiving sensor data from an optical sensor, comparing the sensor data to predetermined quality data indicating at least one known optical quality of the exterior surface or component without icing, and determining the presence of icing on the exterior surface or component based on a difference between the sensor data and the predetermined quality data. Comparing the sensor data to predetermined quality data can include comparing a current shape of the exterior surface or component to a nominal shape of the exterior surface or component.

In certain embodiments, comparing the sensor data to predetermined quality data can include comparing a current reflectance of the exterior surface or component to a nominal reflectance of the exterior surface or component. The method can further include activating a deice system if icing is determined to be present.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
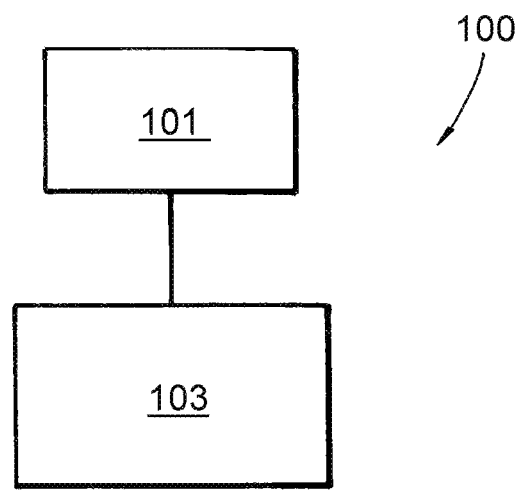
FIG. 1 is a schematic view of an embodiment of a system in accordance with this disclosure.
Figure 2:
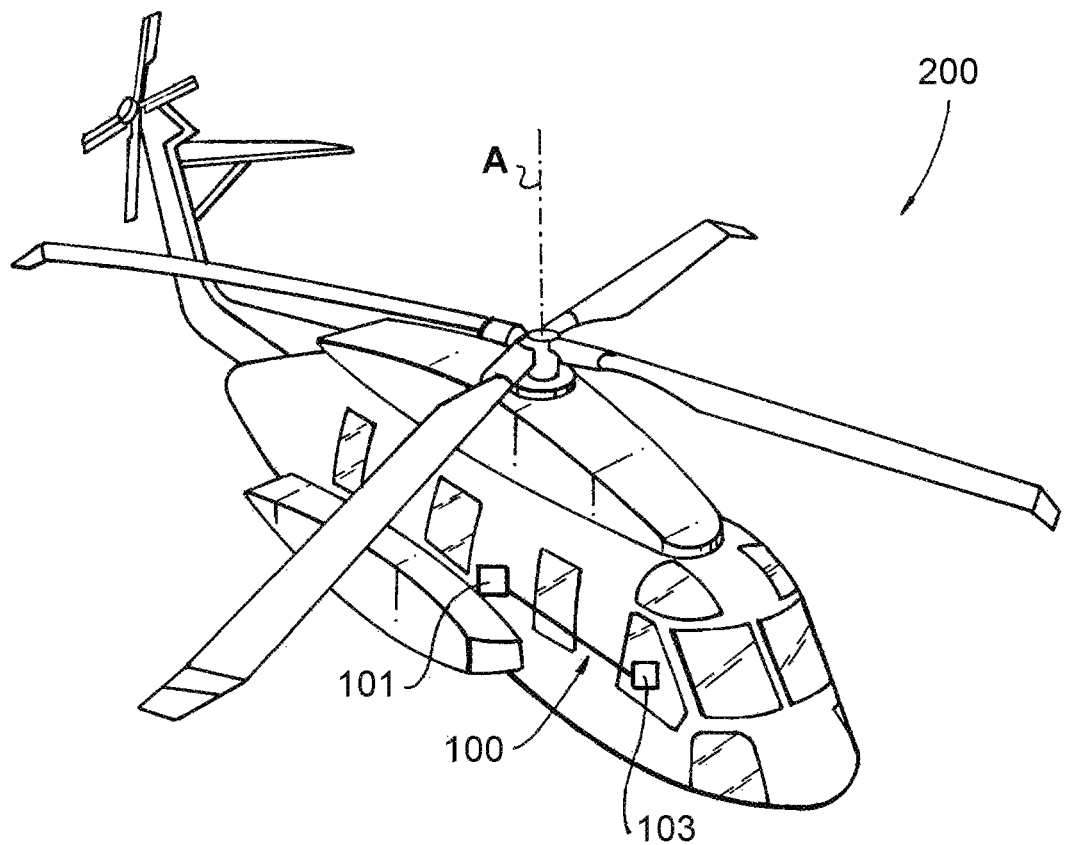
FIG. 2 is a schematic view of an embodiment of an aircraft having the system of FIG. 1 disposed therein.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Certain embodiments or other aspects thereof of this disclosure are shown in FIG. 2. The systems and methods described herein can be used to detect icing, for example.

Referring to FIG. 1, a system 100 for detecting icing includes at least one optical sensor 101 configured to view at least a portion of an exterior surface (e.g., at least one of a wing, a control surface, a structural surface) or component (e.g., at least one of a pitot tube, a rotor blade) of an aircraft (e.g., a fixed wing airplane, a rotorcraft). The sensor 101 is configured to output sensor data indicating at least one optical quality (e.g., shape, reflectance) of the exterior surface or component.

The optical sensor 101 can include a LIDAR sensor for example. Any other suitable sensor type is contemplated herein. The optical sensor 101 can be placed at any suitable location to have any suitable view of an exterior surface or component of the aircraft. In certain embodiments, the optical sensor 101 can be placed within a deice box of its own, or within a cabin of the aircraft.

The system 100 also includes an icing detection module 103. The icing detection module 103 can be embodied using any suitable hardware (e.g., a memory, a processor, a port configured to connect to the sensor 101 wirelessly and/or via hardwire) and/or any suitable software (e.g., stored on the memory and executable by the processor) as appreciated by those skilled in the art.

The icing detection module 103 is configured to receive the sensor data from the optical sensor 101. The icing detection module 103 compares the sensor data to predetermined quality data which indicates at least one known optical quality (e.g., shape, reflectance) of the exterior surface or component without icing. The icing detection module 103 determines the presence of icing on the exterior surface or component based on a difference between the sensor data and the predetermined quality data.

In certain embodiments, the predetermined optical quality data can include a nominal shape of the exterior surface or component. The sensor data can include a current shape of the exterior surface or component. For example, the optical sensor 101 can be configured such that the sensor data includes a 3D point cloud of the exterior surface or component. In certain embodiments, the precise shape and thickness of the ice formed on the exterior surface or component can be determined by subtracting the nominal shape of the 3D point cloud from the current shape of the 3D point cloud.

In certain embodiments, the sensor data can include reflectance of the exterior surface or component. Any other suitable optical quality of the exterior surface or component is contemplated herein.

The predetermined optical quality data can be received from a database (e.g., stored locally on the icing detection module). However, in certain embodiments, the predetermined optical quality data can be created on system start up before flight (e.g., when the exterior surface or component is known to be free of icing).

The icing detection module 103 can be configured to send an alert to a pilot to indicate icing conditions (e.g., to prompt the pilot to activate a deice system or exit icing conditions). In certain embodiments, the icing detection module 103 can be further configured to activate a deice system (e.g., coupled to the exterior surface or component) if icing is determined to be present.

In certain embodiments, the icing detection module 103 can be configured to determine the type of icing (e.g., clear, rime, mixed) based on certain optical characteristics of the ice (e.g., shape of the ice formation, reflectance of the ice). The icing detection module 103 can be configured to determine the severity of icing (e.g., light, moderate, severe) that is occurring based on a rate of increase of the thickness of the ice on the exterior surface or component, for example. It is also contemplated that the icing detection module 103 can be configured to determine whether a deice system is sufficient to counteract the determined icing and to alert a pilot if the deice system is not sufficient to counteract the determined icing (e.g., where ice buildup and/or rate of buildup continues even after an icing system is activated).

In accordance with at least one aspect of this disclosure, a method for detecting icing on an aircraft can include receiving sensor data from an optical sensor 101, comparing the sensor data to predetermined quality data indicating at least one known optical quality of the exterior surface or component without icing, and determining the presence of icing on the exterior surface or component based on a difference between the sensor data and the predetermined quality data. Comparing the sensor data to predetermined quality data can include comparing a current shape of the exterior surface or component to a nominal shape of the exterior surface or component.

In certain embodiments, comparing the sensor data to predetermined quality data can include comparing a current reflectance of the exterior surface or component to a nominal reflectance of the exterior surface or component. The method can further include activating a deice system if icing is determined to be present.

As described above, embodiments of a system 100 (e.g., using one or more LIDARs, cameras, or any other sensors) can be used for image creation and/or pattern matching to detect ice (e.g., in real time). For example, sensors can construct accurate 3D point clouds of the current aircraft surfaces and physical characteristics can be compared against the nominal shape. The nominal shape of the surface can be read from an existing database or be created at the onset of each flight. In flight, the system 100 compares the nominal physical characteristics of the surface versus their current state and can apply pattern matching indicative of ice buildup. If ice buildup is perceived, the system 100 can warn the crew or forwards information to another system to take action. The systems described above can improve safety by providing, amongst other benefits, real time icing detection and/or counteraction.

By way of example, aspects of the invention can be used in coaxial helicopters, on tail rotors, or wings or propeller blades on fixed or tilt wing aircraft. As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The methods and systems of the present disclosure, as described above and shown in the drawings, provide for icing detection systems with superior properties including improved icing detection. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system for detecting icing, comprising:
   an optical sensor configured to view at least a portion of an exterior surface or component of an aircraft and to output sensor data indicating at least one optical quality of the exterior surface or component, wherein the optical sensor is further configured to create a 3D point cloud of the exterior surface or component; and
   an icing detection module configured to:
      receive the sensor data from the optical sensor;
      compare the sensor data to predetermined quality data indicating at least one known optical quality of the exterior surface or component without icing;
      determine the presence of icing on the exterior surface or component based on a difference between the sensor data and the predetermined quality data; and
      determine whether a deice system is sufficient to counteract the determined icing and to alert a pilot when the deice system is not sufficient to counteract the determined icing for which a rate of buildup, based on at least one of a current reflectance and a current shape of the exterior surface or component, continues even after having activated the deice system.

2. The system of claim 1, wherein the optical sensor includes a LIDAR sensor.

3. The system of claim 1, wherein the predetermined optical quality data includes a nominal shape of the exterior surface or component.

4. The system of claim 3, wherein the sensor data includes the current shape of the exterior surface or component.

5. The system of claim 1, wherein the predetermined optical quality data is received from a database.

6. The system of claim 1, wherein the predetermined optical quality data is created on system start up before flight.

7. The system of claim 1, wherein the sensor data includes the current reflectance of the exterior surface or component.

8. The system of claim 1, wherein the icing detection module is further configured to send an alert to a pilot to indicate icing conditions.

9. The system of claim 1, wherein the icing detection module is further configured to activate the deice system if icing is determined to be present.

10. The system of claim 1, wherein the optical sensor is mounted to the aircraft to have a line of sight view of the exterior surface or component.

11. The system of claim 1, wherein the icing detection module configured to determine a type of the determined icing, the type comprising clear icing, rime icing, and mixed icing.

12. The system of claim 1, wherein the optical sensor is housed within a deice box.

13. The system of claim 1, wherein the optical sensor is housed within a cabin of the aircraft.

14. A method for detecting icing on an aircraft, comprising:
   receiving sensor data from an optical sensor, wherein the optical sensor is further configured to create a 3D point cloud of the exterior surface or component;

comparing the sensor data to predetermined quality data indicating at least one known optical quality of the exterior surface or component without icing;

determining the presence of icing on the exterior surface or component based on a difference between the sensor data and the predetermined quality data;

determining whether a deice system is sufficient to counteract the determined icing and to alert a pilot when the deice system is not sufficient to counteract the determined icing for which a rate of buildup, based on at least one of a current reflectance and a current shape of the exterior surface or component, continues even after having activated the deice system.

15. The method of claim 14, wherein comparing the sensor data to predetermined quality data includes comparing the current shape of the exterior surface or component to a nominal shape of the exterior surface or component.

16. The method of claim 14, wherein comparing the sensor data to predetermined quality data includes comparing the current reflectance of the exterior surface or component to a nominal reflectance of the exterior surface or component.

17. The method of claim 14, further comprising activating the deice system if icing is determined to be present.

* * * * *